Dec. 30, 1969  J. BRANÝ ET AL  3,486,616
METHOD AND ARRANGEMENT FOR CHECKING DEFICIENCIES OF
SHAPE OF ROTATION BODIES
Filed May 25, 1966
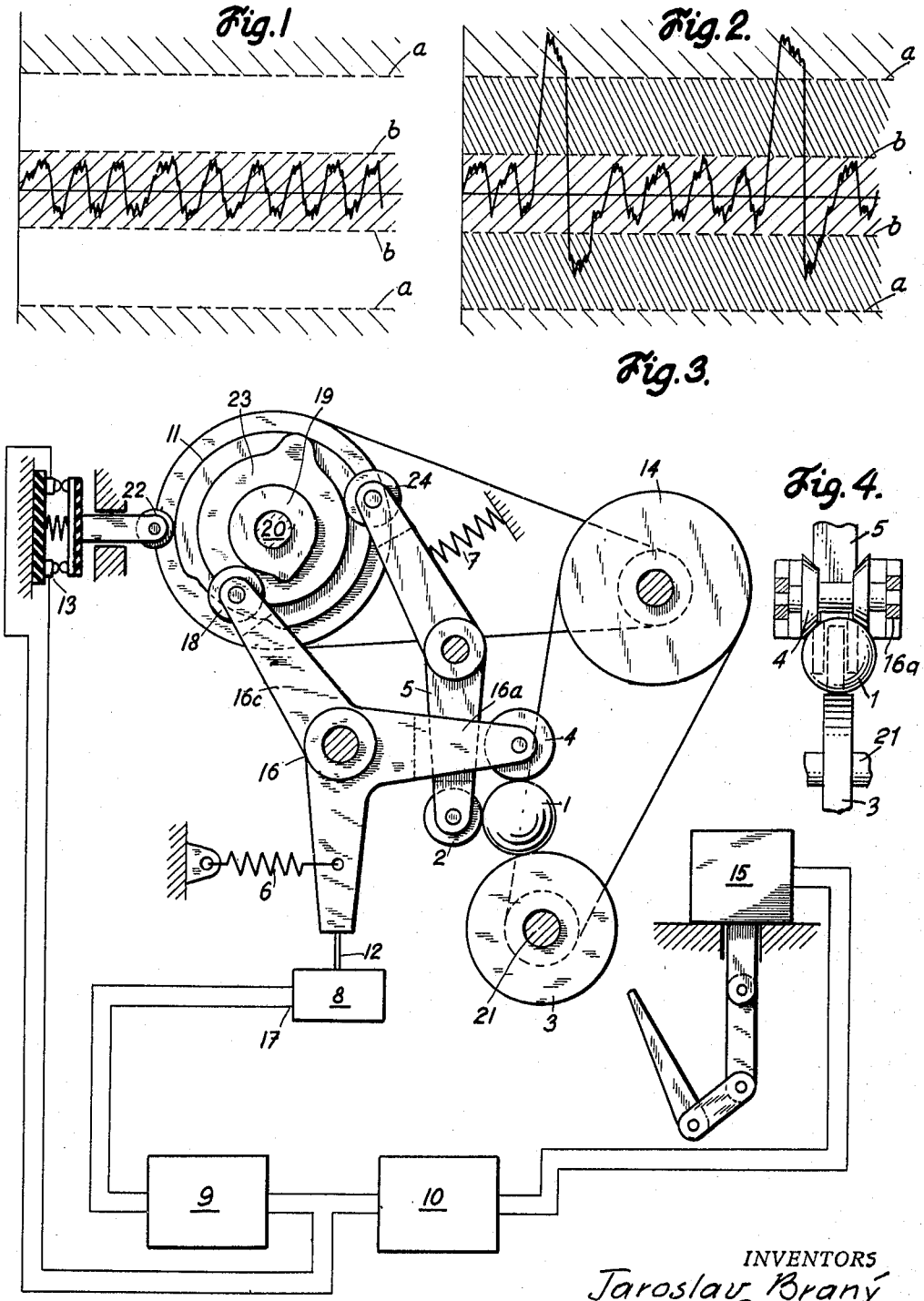
INVENTORS
Jaroslav Brany
Jiři Panek
By Richard ...
Ag't

United States Patent Office 3,486,616
Patented Dec. 30, 1969

3,486,616
METHOD AND ARRANGEMENT FOR CHECKING DEFICIENCIES OF SHAPE OF ROTATION BODIES
Jaroslav Brany and Jiří Pánek, Prague, Czechoslovakia, assignors to Vyzkumny ustav strojirensko technologie a ekonomiky, Prague, Czechoslovakia
Filed May 25, 1966, Ser. No. 552,903
Claims priority, application Czechoslovakia,
June 8, 1965, 3,691/65
Int. Cl. B07c 5/34
U.S. Cl. 209—80
5 Claims

ABSTRACT OF THE DISCLOSURE

The elements of rolling apparatus and a rotary body rotated by the apparatus are tested for malformation of configuration by supporting the body between and in contact with a driving element, a supporting element and a control element. The rotary body is rotated by the elements so that its entire surface is sequentially positioned in a checking area. Vibrations produced by irregularities in configuration of the body and of the elements are selectively transmitted to a vibration sensitive device via one of the elements. The vibrations are evaluated by electrically connecting the vibration sensitive device to an evaluating circuit. The body is selectively rejected by selective actuation of an ejecting device in accordance with the amplitude of the vibrations.

---

This invention relates to a method and to an arrangement for checking deficiencies of shape of rotation bodies, particularly of balls of ball bearings.

Arrangements for visual checking of balls are generally provided with additional arrangements for determining deficiencies of shape, since the visual checking does not reliably indicate such deficiencies. Such a checking method is based on the principle of controlling the number of revolutions of the checked ball and on the assumption that the checked rotation body, due to a malformation or deficiency in configuration, is slowed in its motion or stopped by one or more of the supporting or driving elements, so that the number of its revolutions is decreased or it comes to a standstill. Experience has shown, however, that under certain circumstances, depending upon the rotary speed of the ball, its moment of inertia, the magnitude of the pressure and the extent of the deficiency in configuration, the rotating ball not only does not stop, and the number of revolutions is not decreased, but due to the deficiency of shape the patterns for rolling and for producing meridians are broken and the ball starts to turn around the same axis while oscillating, so that the same meridian always comes under the checking position.

Another arrangement for checking deficiencies of shape or configuration, based upon the measuring of the absolute size of the checked ball, involves measuring by a checking lever. The deviation of the checking lever influences a light pulse, which controls a classifying device via a light sensitive cell. This checking arrangement, however, does not determine deficiencies of a magnitude which is equal to or smaller than the manufacturing tolerances of the balls. The checking lever must be adjusted to the range of tolerance of the balls in order to prevent the removal of good balls only because they are not of the exact nominal diameter. In addition, the lever has a relatively large moment of inertia and under operating conditions, where the rotary speed of the ball is large and the deficient area or area of malformation comes into contact with the checking lever within a time interval of the order of one thousandth or even of one ten-thousandth of a second, its is unable to register this deficiency. For this reason the present devices are unreliable and thus also unsuitable for exact checking.

The disadvantages of the known systems are eliminated by this invention, the object of which is to provide a method for checking deficiencies of shape or configuration of rotary bodies and deficiencies of all elements of the rolling device which roll the rotary body so that its whole surface subsequently comes under the checking position. In the method of the present invention, the rotary body is inserted between driving, supporting and control elements, which follow its surface. One of these elements, for example, the control element, is connected to an electric system which checks the vibrations of the body. The vibrations are transferred via an evaluating circuit and a locking element to the selecting circuit of the classifying device.

In the apparatus of the present invention, the control element is affixed to one arm of a three-arm lever, the second arm of which rests upon the transmission element of a pick-up device. The pick-up device is connected via the evaluating circuit and the locking element to the selecting circuit controlling the classifying device. The third arm of the three arm lever is provided with a roller, contacting a cam on a common cam shaft which supports another cam which is in contact with the roller of the locking element. Another cam on the cam shaft is in contact with a roller mounted on the end of a two-arm lever, on the other end of which a supporting element is mounted. The cam shaft is linked by transmission gears with the shaft of the driving element.

In order that the present invention may be readily carried into effect, it will now be drescribed with reference to the accompanying drawings, wherein:

FIG. 1 is an illustration of vibrations of the rolling apparatus including a checked body or body being tested which has no deficiencies in shape or configuration;

FIG. 2 is an illustration of vibrations of the apparatus including a checked body having deficiencies in configuration or apparatus having deficiencies in configuration;

FIG. 3 is a schematic diagram and circuit diagram of an embodiment of the present invention for checking deficiencies of configuration in a rotating body; and FIG. 4 is a side view of part of the apparatus of FIG. 3.

The entire rolling apparatus, comprising supporting, pressure, driving and control elements, generates vibrations when it is in operation. The vibrations are oscillations of different polarity and amplitude. The rotary test body or ball also produces vibrations when it rolls. The nature or extent of these vibrations depends upon the condition of the rolling apparatus and the shape or configuration of the surface of the test ball. If both the apparatus and the ball are without deficiencies, the vibrations have a low level of amplitude. The quality of the apparatus may be determined by the level of vibrations in idle operation. The quality of the test balls is determined by the level of vibrations in operation of the apparatus. As soon as an element of the rolling apparatus comes in contact with an irregularity of configuration of the test body or ball, a shock occurs. The shock or impact is transformed to a sudden change of a voltage amplitude. Similarly, any deficiency of any element of the rolling apparatus is indicated. Such deficiencies may be caused by impact or by wear due to prolonged operation, for example. Even a variation of the order of several microns causes a change in the variation vibrations.

The polarity of the peak amplitude of the vibrations varies in accordance with the nature, type or character of the deficiency. The vibrations have a greater peak amplitude of one polarity, relative to the axis determining the mean value of vibrations, when the malformation or deficiency is directed into the material of the ball, as in the case of cracks, for example. The vibrations have a greater peak amplitude of the other polarity, relative to the mean axis, when the malformation is directed away from the center of the ball, as in the case of bulges, for example.

Since the vibrations are a function of the quality or configuration of the surface of the tested ball, they are produced only when there are relative changes in such surface. The vibrations therefore illustrate relative changes in the exact shape of the test body, so that the absolute dimensions of said body do not influence said vibrations. The amplitude of the individual oscillations depends upon the magnitude of the shock or impact, which is influenced by the magnitude of the malformation, irregularity or deficiency in configuration or shape.

A greater irregularity or deficiency in shape produces a pulse of higher amplitude or magnitude and thus of higher voltage amplitude. The vibrations which are received by the pick-up device result from partial vibrations of the individual elements of the rolling apparatus and vibrations produced by the test body. Partial vibrations, during which an impact is caused by a deficiency of an element of the rolling apparatus which comes into contact with the test ball or vice versa, thus influence the resultant vibrations picked up or sensed by the pick-up device.

The vibrations of the rolling apparatus and of a test body devoid of deficiencies have an amplitude which is below the adjustable level of the actuation range of the amplitude selecting circuit, so that there is no utilization of such vibrations (FIG. 1). If there are deficiencies which produce vibrations having an amplitude which is above the adjusted level of the actuation range of the amplitude selecting circuit (FIG. 2), said vibrations cause the transfer of a pulse to the classifying device.

As shown in FIGS. 1 and 2, the actuation range of the amplitude selecting circuit is limited by the limit *a*, which is the limit of irregularities or deficiencies of configuration of a rotary body. The range between the limits *a* and *b*, the latter being the noise limit of the apparatus, is the range of malformations of configuration which do not influence the rotatability of the rotary body and deficiencies within this range do not actuate the amplitude selecting circuit. This range is indicated in FIG. 2 by hatching. The noise range of the apparatus is indicated by hatching in FIG. 1. As long as the noise does not exceed the limit *b* of the noise range, the apparatus is in good mechanical condition and is capable of proper operation.

The apparatus of the present invention, for undertaking the method of the present invention, is shown in FIG. 3. In FIG. 3, the rotary test body or ball 1 for ball bearings rolls in the rolling apparatus which comprises a supporting element 2, a driving element 3 and a control element 4, which is also the pressure element. The operation of some of these elements is mutually exchangeable. The control element 4 is pressed against the ball 1 by a three arm lever 16 loaded by the spring 6. The supporting element 2 is mounted on one arm of a two arm lever 5 and is pressed by the spring 7 against the ball 1, thereby determining its position. The control element 4 is rotatably mounted on one arm 16a of the three arm lever 16. A transmission element 12 is in contact with the second arm 16b of the lever 16. A roller 18 is mounted on the third arm 16c of the three arm lever 16 and is in contact with the working surface of a cam 19 affixed to a cam shaft 20. A second cam 23 is affixed to the cam shaft 20 and a roller 24 of the two arm lever 5 contacts said cam. The transmission element 12 is affixed to the pick-up device 8 and functions to pick up vibrations. The pick-up device 8 may be linked with any element of the rolling apparatus which is able to follow the surface of the ball 1 or it may be in direct contact with the ball 1. The closer the pick-up device 8 is to the source of vibrations, the more sensitive the transmission. The output of the pick-up device 8 is connected to an evaluating circuit 9 which, after amplification transmits the signal to an amplitude selecting circuit 10. The amplitude selection circuit 10 controls a classifying device 15. The amplitude selecting circuit 10 is permitted to operate by a locking element 13 controlled by a cam 11. The cam 11 is in contact with a roller 22 of the locking element 13. The cam 11 is rotated by the shaft 21 of the driving element 3 via a transmission gear 14.

The test ball 1 is supplied from a hopper (not shown in the figures) to the rolling apparatus, where a rolling motion is imparted to it by the driving element 3. The test ball, is maintained in its position by the supporting element 2 and by the control element 4. These elements of the rolling apparatus contact the ball 1 in the manner shown in FIG. 4 and equally provide a rotary movement to said ball. During the mutual contact of the ball 1 and the individual elements of the apparatus, smaller or larger vibrations are produced in accordance with the regularity of the spherical shape of said ball. As long as the surface of the checked ball differs from the exact geometric spherical shape within limits permitted by manufacturing tolerances, the transmitting element 12 transmits to the pick-up device 8 a signal having an amplitude level which is below the level of the preadjusted actuation range of the amplitude selecting circuit 10. The signal amplified by the evaluating circuit 9 does not actuate the amplitude selecting circuit 10. If there is an irregularity in the configuration of the ball 1 sufficient to increase the amplitude level of the signal, the evaluating circuit 9 selects the highest oscillation according to polarity and amplitude, amplifies it and supplies it to the amplitude selecting circuit 10 which is actuated and supplies a pulse to the classifying device 15 which causes the removal of the ball 1 as a deficient one.

The amplitude selecting circuit 10 is in operation only during the time that the ball 1 is checked. During the removal of the ball 1 and its replacement by the next succeeding ball, the amplitude selecting circuit 10 is maintained inoperative, non-actuated or locked by the locking element 13. The movements of the locking element 13 are synchronized by a cam or lever arrangement with the time interval during which the ball 1 is exchanged. As soon as the roller 18 mounted on the third arm 16c of the three arm lever 16 strikes the projection of the cam 19, the control element 4 mounted on the first arm 16a of said lever is raised, thus clearing the way for the removal of the ball 1, and the second arm 16b of said lever is moved out of engagement with the transmission element 12.

The cam 11 and the cam 23 rotate with the cam 19. The roller 22 of the locking element 13 moves into the recess of the cam 11 and said locking element deactuates the amplitude selecting circuit 10 by opening the circuit between said circuit 10 and the evaluating circuit 9. The projection of the cam 23 moves the roller 24 mounted on one end of the two arm lever 5, thus moving the supporting element 2, and the ball 1 has a clear way out of the rolling apparatus. During subsequent rotation of the cam 23, the roller 24 contacts the other slope of the projection of the cam 23, thus slowly returning the supporting element 2 to a position in which it is in contact with the next-succeeding ball 1, which is then also in contact with the control element 4.

The position of the control element 4 is controlled by the roller 18 which follows the circumference of the cam 19 and is, at such time, behind the projection of said cam. The roller 22 of the locking element 13 moves out of the recess of the cam 11 so that said locking element again connects the amplitude selecting circuit 10 to the evaluating circuit 9. The connection of the amplitude selecting circuit 10 into the circuit only during the time interval within which an irregularity of the rotary body 1 is expected prevents shocks occurring during the exchange of the balls, so that such shocks do not influence the required operation of the classifying device 15. Properly operating rolling apparatus produces noise during its operation. If the apparatus is in good mechanical condition, however, the level of the noise is low, so that it does not affect the evaluating circuit 9 since it is below the actuation range of the amplitude selecting circuit 10. The low noise level indicates that the arrangement is in proper operating condition. If the mechanical condition of the apparataus deteriorates in any way, the signal noise level increases. A comparison of the noise level of the signal amplitude of the tested or checked aggregate with the signal noise level of an aggregate apparatus in good condition permits a determination of the mechanical condition of said tested aggregate without measuring the individual elements of the apparatus. Thus, possible failures of the aggregate, due to its operation with a fault, are prevented.

The apparatus and method of the present invention are simple and reliable. Irregularities in configuration are determined without regard to the nominal dimensions of the tested body, so that the invention is universally applicable and may be used to test all the balls of ball bearings without regard to their diameter, for example. The universal application of the apparatus is also due to the fact that it checks not only for deficiencies of configuration of the balls, but also for deficiencies of any element of the rolling apparatus.

The ball 1 is suitably supported by the structure of the present invention, as illustrated in FIG. 4, or by any suitable structure such as, for example, that described in copending patent application Ser. No. 499,802, filed Oct. 21, 1965 by Jaroslav Brany and assigned to the assignee of the present invention.

The entire surface of the bearing or ball 1 comes in contact with the control element 4, due to the rolling of said ball. The rolling of the ball 1 produces meridians thereon formed by the points of contact with the control element 4, as described in said copending patent application. The control element 4 is a double roller, as is the double roller 21 of FIG. 11 of said copending patent application. The double roller, as illustrated in FIG. 4, has two active surfaces linked by a cylindrical part, both active surfaces being equal and having their smaller diameter parts facing each other.

The ball 1, as shown in FIG. 4, is supported by the active surfaces of the control element 4, by one surface of the supporting element 2 (not shown in FIG. 4) and by one surface of the driving element 3. The active surface of the double roller is determined by generating lines with a different angle of continuously changed inclination. The meridians are thus generated on the surface of the ball during the rolling of said ball. A checking head or lapping roller forms a wider trace than a diamond point would, and the entire surface of the ball is inspected. The control element 4 thus indicates all irregularities in the configuration of the ball 1 via the three-arm lever 16 and the transmitting element 12 (FIG. 3).

The pick-up device 8 (FIG. 3) may be linked to any element of the rolling apparatus and senses vibrations produced by irregularities in the configuration of the element to which it is linked, since such vibrations are transferred from one element to another. The closer the pick-up device 8 is to the element having deficiencies in configuration, the more sensitive said pick-up device. The pick-up device cannot, however, be linked directly to the ball 1, since said device would damage the sensitive surface of said ball.

We claim:
1. Apparatus for testing the elements of rolling apparatus and a rotary body rotated by said rolling apparatus for malformation of configurtion, said apparatus comprising
   a three arm lever rotatably mounted and having three arms;
   a control element mounted on one arm of said lever in contact with said rotary body;
   a driving element in contact with said rotary body;
   a supporting element in contact with said rotary body, said driving element, said control element and said supporting element supporting said rotary body between them and rotating said rotary body so that its entire surface is sequentially positioned in a checking area;
   a vibration sensitive device;
   transmitting means for selectively transmitting vibrations produced by irregularities in configuration of said rotary body and irregularities in configuration of said elements to said vibration sensitive device via said lever;
   evaluating circuit means electrically connected to said vibration sensitive device for evaluating said vibrations;
   ejecting means in operative proximity with said rotary body; and
   circuit means electrically connecting said ejecting means to said evaluating circuit means for selectively rejecting said rotary body by selectively actuating said ejecting means in accordance with the amplitude of said vibrations.

2. Apparatus as claimed in claim 1, wherein said vibration sensitive device has a transmission member for transferring vibrations and a second arm of said lever contacts said transmission member and transfers vibrations thereto.

3. Apparatus as claimed in claim 2, wherein said circuit means comprises locking means and an amplitude selecting circuit electrically connected to said ejecting means and electrically connected to said evaluating circuit via said locking means, and further comprising timing cam means for selectively operating said locking means to selectively close the circuit between said evaluating circuit and said amplitude selecting circuit thereby selectively actuating said ejecting means when the amplitude of said vibrations is greater than a predetermined magnitude.

4. Apparatus as claimed in claim 3, wherein said timing cam means comprises a cam shaft, a first cam affixed to said cam shaft, a roller mounted on a third arm of said lever in contact with said first cam and a second cam affixed to said cam shaft and abutting said locking means to selectively operate said locking means.

5. Apparatus as claimed in claim 4, further comprising a two arm lever rotatably mounted and having two arms and means for transmitting motion from said driving element to said cam shaft, and wherein said timing cam means further comprises a third cam affixed to said cam shaft, and wherein said supporting element is mounted on one arm of said two arm lever and the other arm of said two arm lever is in contact with said third cam.

References Cited

UNITED STATES PATENTS

| | | | |
|---|---|---|---|
| 2,763,152 | 9/1956 | Birdsall | 73—67 |
| 3,263,809 | 8/1966 | Mandula et al. | 209—73 |

RICHARD C. QUEISSER, Primary Examiner

JOHN R. FLANAGAN, Assistant Examiner

U.S. Cl. X.R.

73—67; 209—88